US010151338B2

(12) United States Patent
Ochrimenko

(10) Patent No.: US 10,151,338 B2
(45) Date of Patent: Dec. 11, 2018

(54) PLIABLE MATERIAL WITH INTEGRAL SUCTION RECESS FOR ATTACHMENT TO A SURFACE

(71) Applicant: Adam Thomas Ochrimenko, Boca Raton, FL (US)

(72) Inventor: Adam Thomas Ochrimenko, Boca Raton, FL (US)

( * ) Notice: Subject to any disclaimer, the term of this patent is extended or adjusted under 35 U.S.C. 154(b) by 0 days.

(21) Appl. No.: 15/174,782

(22) Filed: Jun. 6, 2016

(65) Prior Publication Data
US 2018/0003215 A1    Jan. 4, 2018

(51) Int. Cl.
*F16B 47/00* (2006.01)

(52) U.S. Cl.
CPC .................................. *F16B 47/00* (2013.01)

(58) Field of Classification Search
CPC ....................................................... F16B 47/00
USPC ......... 248/205.5, 205.7, 206.1, 206.2, 206.3, 248/362
See application file for complete search history.

(56) References Cited

U.S. PATENT DOCUMENTS

| 1,510,647 | A | | 10/1924 | Bomar | |
|---|---|---|---|---|---|
| 5,204,159 | A | * | 4/1993 | Tan | E01C 5/20 15/215 |
| 5,671,910 | A | * | 9/1997 | Davies | B25B 11/005 269/21 |
| 6,596,374 | B1 | * | 7/2003 | Adjeleian | B60N 3/103 206/490 |
| 8,794,536 | B2 | * | 8/2014 | Johnson | F16L 347/00 235/487 |
| 2012/0175485 | A1 | * | 7/2012 | Buckley | H04B 1/662 248/363 |

* cited by examiner

*Primary Examiner* — Steven M Marsh
(74) *Attorney, Agent, or Firm* — Gary H Monka, Esq.

(57) ABSTRACT

An apparatus that can be easily attached to and flush mounted on an attachment surface such as a surface of a bathtub, bathtub rim, wall or the like is disclosed. The apparatus includes a body fabricated from a pliable material such as rubber, silicone or polyurethane, and is provided with at least one substantially concave openings extending partially through a thickness of the body from a bottom surface towards a top surface. Each opening is arranged so as to leave a reduced body thickness between an apex of the opening and the top surface. This configuration enables the apparatus to be attached to a surface by suction when the pliable material is depressed over the at least one opening from the top surface towards the bottom surface.

19 Claims, 3 Drawing Sheets

PLIABLE MATERIAL WITH INTEGRAL SUCTION RECESS FOR ATTACHMENT TO A SURFACE

BACKGROUND

The present disclosure relates generally to attaching a pliable or pliable material to an attachment surface, and more particularly, to a product configuration that can be readily flush mounted by suction on a surface of a bathtub and/or bathtub rim, a wall or the like.

SUMMARY

In accordance with an aspect of the disclosure, there is provided an apparatus for attachment to an attachment surface by suction. The apparatus includes a body fabricated from a pliable material that includes a top surface and a bottom surface disposed opposite the top surface to define a thickness of the body between the top surface and bottom surface. The body defines at least one integrally formed opening extending partially through the thickness of the body from the bottom surface towards the top surface. The at least one opening permits attachment by suction of the body to the attachment surface when the pliable material is depressed over the opening from the top surface towards the bottom surface.

In accordance with a further aspect of the disclosure, each opening is substantially concave in shape and leaves a reduced thickness of the body between an apex of the opening and the top surface.

In accordance with yet another aspect of the disclosure, the body is fabricated from one of rubber, silicone and polyurethane.

In accordance with yet another aspect of the disclosure, the body is a bathtub toy and shaped to represent one of a toy letter, number, character, animal, vehicle or the like.

In accordance with these and additional aspects that will become apparent hereinafter, the present disclosure will now be described with particular reference to the accompanying drawings.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
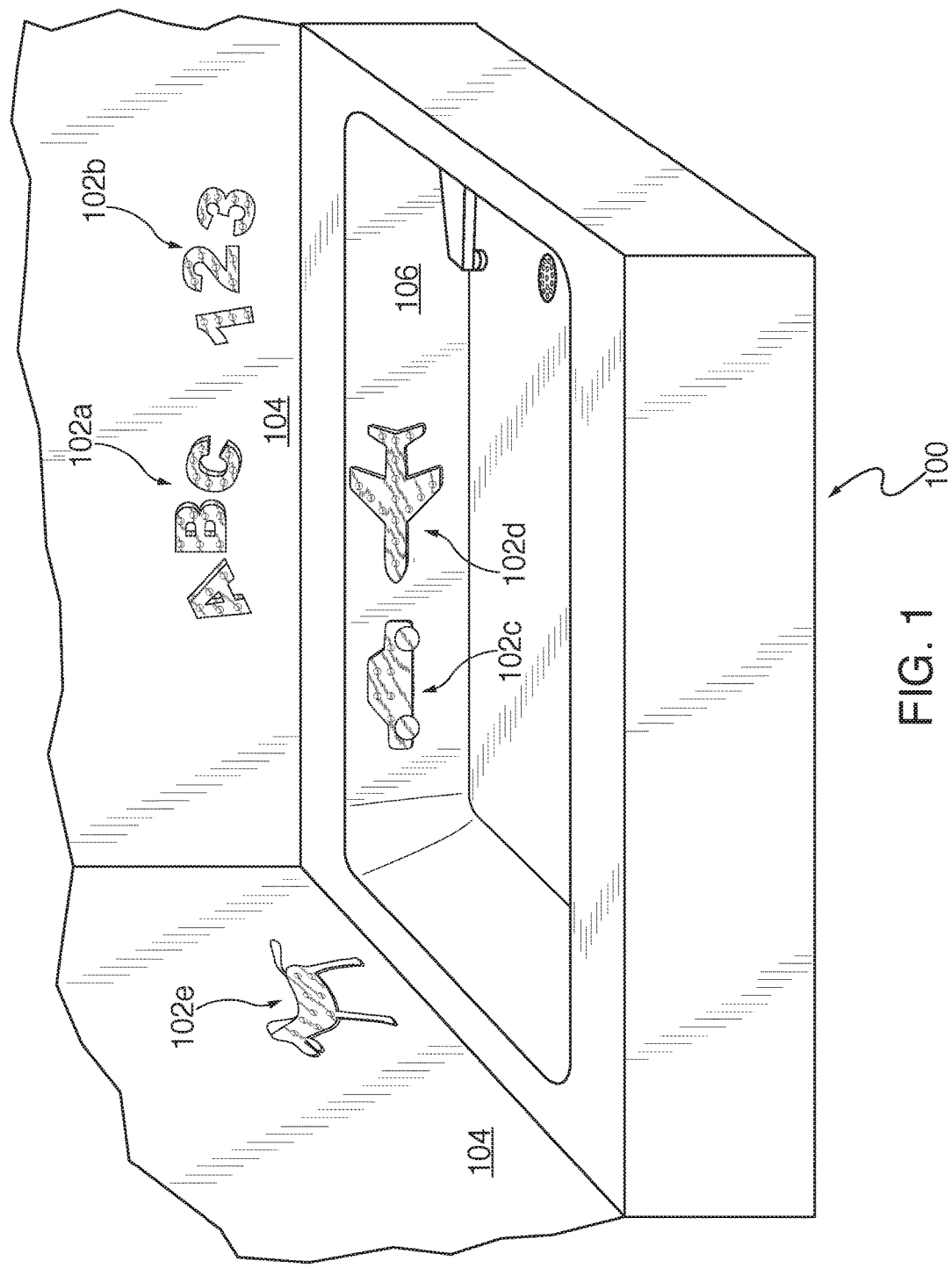
FIG. 1 is an isometric view of an illustrative bathtub with an apparatus formed of a pliable material shaped in the form of toy letters, numbers, vehicles, and an animal, attached thereto in an exemplary installation.

Specific embodiments of the disclosure will now be described in detail with reference to the accompanying figures. For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

In the following detailed description of embodiments of the disclosure, numerous specific details are set forth in order to provide a more through understanding of the disclosure. However, it will be apparent to those skilled in the art that the disclosure may be practiced without these specific details. In other instances, well-known features have not been described in detail to avoid unnecessarily complicating the description.

Referring to FIG. 1 there is depicted an isometric view of an illustrative bathtub 100 with a plurality of representative children's bathtub toys generally configured as letters 102a, numbers 102b, car 102c, airplane 102d and animal 102e (referred to generally as apparatus 102) attached to one of a wall 104a, 104b and surface 106 of the bathtub 100. The shapes depicted are merely exemplary and it will be appreciated by those skilled in the art that the apparatus 102 may be configured in a variety of shapes to represent many different types of numbers, letters, characters, animals, vehicles, or the like, the pictorially depicted representations being merely exemplary. Furthermore, although shown and described as a bathtub toy for use in a bathtub environment, the principles of the disclosed apparatus can be applied to attach any such structure to a wall, window, or any other attachment surface within the scope of the present disclosure.

Figure 2A:
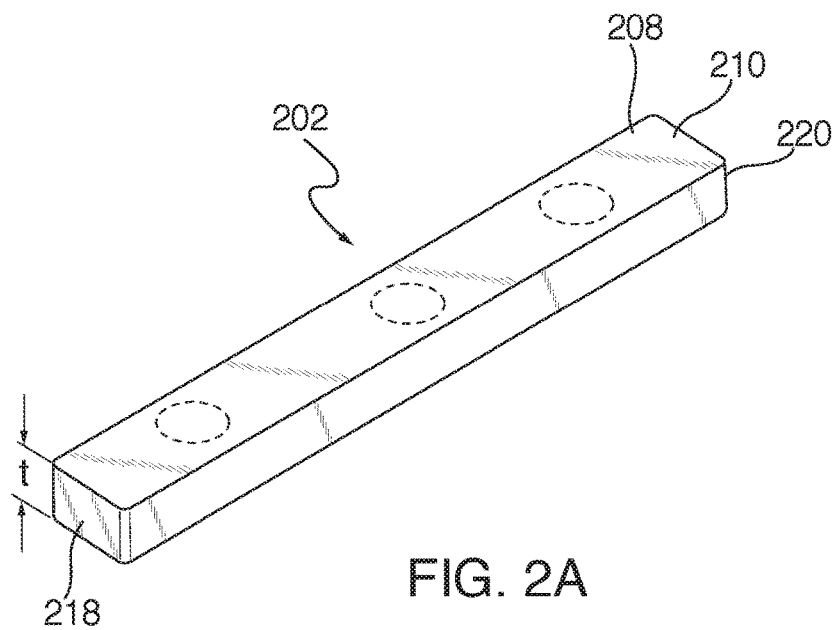
FIGS. 2A and 2B are top and bottom isometric views of an illustrative apparatus in accordance with an aspect of the disclosure.
Figure 2B:
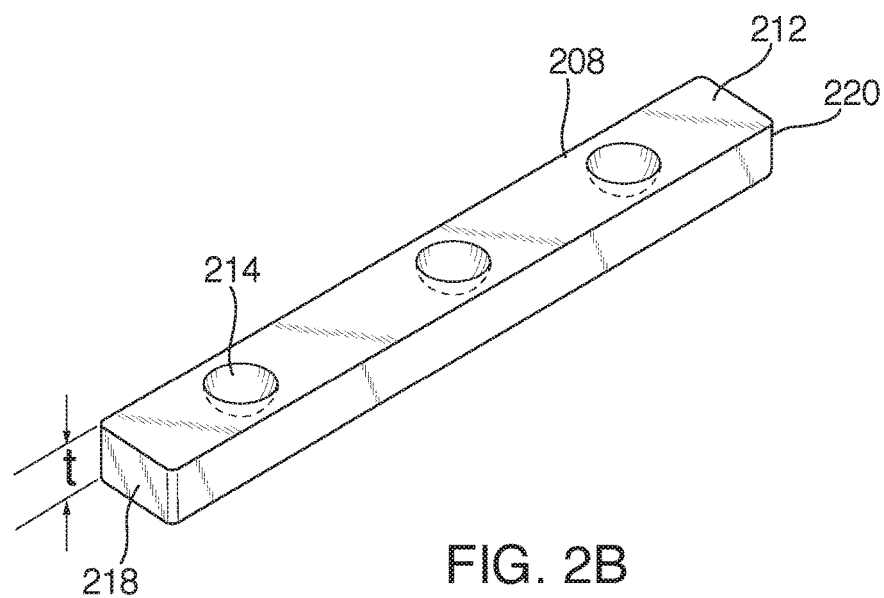

FIGS. 2A and 2B are isometric views of a sample bathtub toy number configured as the number "1" 202 in accordance with aspects of the present disclosure. Bathtub toy 202 includes a body 208 fabricated, such as by injection molding, from a pliable or flexible material such as rubber, silicone or polyurethane. The body 208 includes a top surface 210 and a bottom surface 212 disposed opposite the top surface 210 to define a thickness "t" of the body 208 between the top surface 210 and bottom surface 212. The body defines at least one, in this example, a plurality of integrally or unitarily formed substantially concave openings 214 extending partially through the thickness of the body 208 from the bottom surface towards the top surface 210 and disposed proximal to each other and extending between a first side 218 and a second side 220 of the body 208. Each substantially concave opening 214 leaves a reduced body thickness between an apex of the substantially concave opening and the top surface 210.

Figure 3:
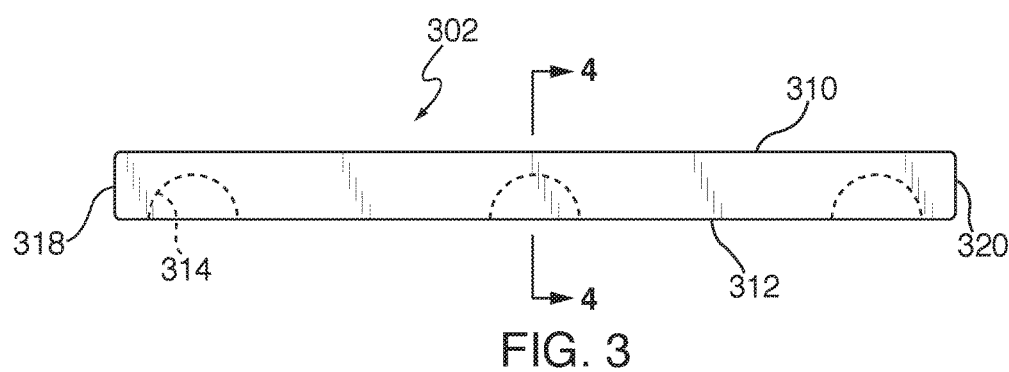
FIG. 3 is a side elevation view of the illustrative apparatus.

FIGS. 3 is a side elevation view of the bathtub toy 302, with the plurality of substantially concave openings 314 in body 308 shown as hidden lines. The substantially concave openings 314 extend from the bottom surface 312 towards the top surface 310, and are spaced along the length of body 308 between first side 318 and second side 320.

Figure 4:
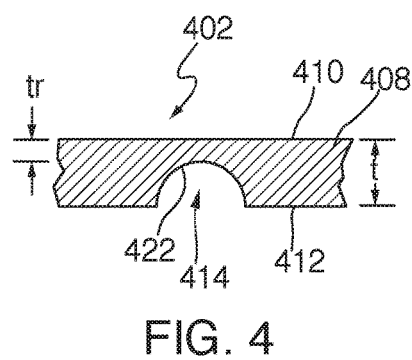
FIG. 4 is a sectional view along lines 4-4 in FIG. 3, showing detail of the substantially concave opening formed in the body of the apparatus.

FIG. 4 is a sectional view along lines 4-4 in FIG. 3, showing a bathtub toy 402 with details of a substantially concave opening 414 formed in body 408 of thickness "t" between top surface 410 and bottom surface 412. The substantially concave opening 414 leaves a reduced body thickness "$t_r$" between an apex 422 of the opening 414 and the top surface 410. It will be understood by those skilled in the art, that although depicted as spherical, an alternative substantially convex opening may include non-spherical segments, such as for example, a flat apex and a conical side extending from bottom surface 412 to the apex. Any integrally or unitarily formed recess capable of providing suction may be employed within the scope of the disclosure.

Figure 5:
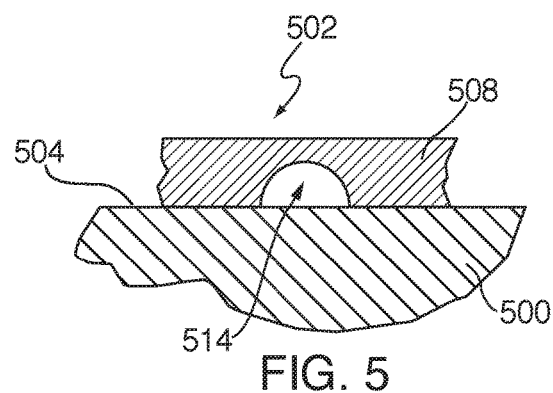
FIG. 5 is a sectional view similar to FIG. 4, showing the apparatus overlying a surface prior to attachment.

FIG. 5 is a sectional view similar to FIG. 4, showing a portion of the bathtub toy 502 placed on top of a tub surface 504 of tub 500 prior to attachment. As shown, the body 508 of bathtub toy 502 includes the substantially concave opening 514 defined in body 508 that overlies tub surface 504. The plurality of substantially concave openings permitting attachment by suction of the body to an attachment surface when the pliable material is depressed over each substantially concave opening from the top surface towards the bottom surface.

Figure 6:
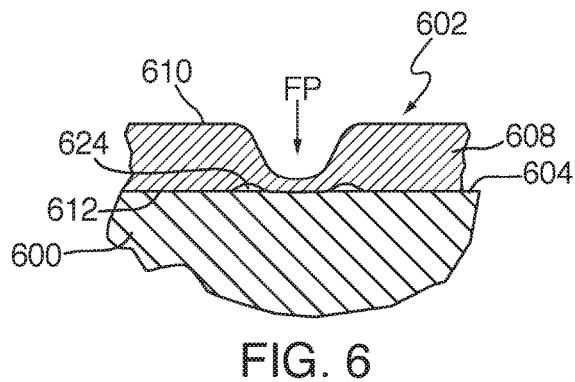
FIG. 6 is a sectional view similar to FIG. 5 depicting the apparatus secured to the surface of FIG. 5 by suction in accordance with aspects of the disclosure.

FIG. 6 illustrates attachment of the bathtub toy 602 to surface 604 of the tub 600. Finger pressure "FP" is applied from the top surface 610 over the substantially convex opening (515, FIG. 5) to push the area of reduced thickness $t_r$ of body 608 to make contact against surface 604. In this manner suction is applied in the remaining annular space 624 to attach a portion of the bathtub toy 602 to tub 600. This procedure is repeated for the plurality of substantially convex openings in body 608 to attach the entire bathtub toy 602 to tub 600. In order to aid in the attachment, the bottom surface 612 of body 608 may have water applied to surface 612 to assist in proper suction. To remove the bathtub toy 602, the body 608 is simply peeled away from the attachment surface 604.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows.

I claim:

1. An apparatus attachable to an attachment surface by suction, comprising:
    a body fabricated from a pliable material and including a top surface and a bottom surface disposed opposite the top surface to define a solid thickness of the body between the top surface and bottom surface;
    the body defining at least one opening extending partially through the solid thickness of the body from the bottom surface towards the top surface, the body further defining a portion of reduced thickness through the body above the opening that may be deformed in response to finger pressure on the top surface over the opening, thereby permitting attachment by suction of the body to the attachment surface as the volume of the opening is reduced in response to finger pressure over the portion of reduced thickness until a bottom side of the portion of reduced thickness contacts the attachment surface.

2. The apparatus of claim 1, wherein each opening is substantially concave.

3. The apparatus of claim 2, wherein each substantially concave opening leaves a reduced thickness of the body between an apex of the opening and the top surface.

4. The apparatus of claim 1, wherein the pliable material is one of rubber, silicone and polyurethane.

5. The apparatus of claim 1, wherein the body is shaped to represent a letter.

6. The apparatus of claim 1, wherein the body is shaped to represent a number.

7. The apparatus of claim 1, wherein the body is shaped to represent at least one of a toy character, animal, and vehicle.

8. The apparatus of claim 1, wherein the bottom surface of the body is flat.

9. An apparatus attachable to an attachment surface by suction, comprising:
    a body fabricated from a pliable material and including a top surface and a bottom surface disposed opposite the top surface to define a solid thickness of the body between the top surface and bottom surface;
    the body defining a plurality of substantially concave openings extending partially through the solid thickness of the body from the bottom surface towards the top surface, each substantially concave opening leaving a reduced body thickness between an apex of each opening and the top surface above each opening that may be deformed in response to finger pressure on the top surface over each opening, thereby permitting attachment by suction of the body to the attachment surface as the volume of each opening is reduced in response to finger pressure over the portion of reduced thickness until a bottom side of the portion of reduced thickness contacts the attachment surface.

10. The apparatus of claim 9, wherein the pliable material is one of rubber, silicone and polyurethane.

11. The apparatus of claim 9, wherein the body is shaped to represent a letter.

12. The apparatus of claim 9, wherein the body is shaped to represent a number.

13. The apparatus of claim 9, wherein the body is shaped to represent at least one of a toy character, animal, and vehicle.

14. The apparatus of claim 9, wherein the bottom surface of the body is flat.

15. A toy attachable to an attachment surface, comprising:

a body fabricated from a pliable material and including a top surface and a flat bottom surface disposed opposite the top surface to define a solid thickness of the body between the top surface and bottom surface;

the body defining a plurality of substantially concave openings extending partially through the solid thickness of the body from the bottom surface towards the top surface and disposed proximal to each other and extending between a first side and a second side of the body, each substantially concave opening leaving a reduced body thickness between an apex of each opening and the top surface above each opening that may be deformed in response to finger pressure on the top surface over each opening, thereby permitting attachment by suction of the body to the attachment surface as the volume of each opening is reduced in response to finger pressure over the portion of reduced thickness until a bottom side of the portion of reduced thickness contacts the attachment surface.

16. The toy of claim 15, wherein the pliable material is one of rubber, silicone and polyurethane.

17. The toy of claim 15, wherein the body is shaped to represent a letter.

18. The toy of claim 15, wherein the body is shaped to represent a number.

19. The toy of claim 15, wherein the body is shaped to represent at least one of a toy character, animal, and vehicle.

* * * * *